United States Patent [19]

Altmeier

[11] Patent Number: 5,746,917
[45] Date of Patent: May 5, 1998

[54] STRONGLY ALKALINE ANION EXCHANGE MEMBRANES AND PROCESS FOR PRODUCING THE SAME

[76] Inventor: Patrick Altmeier, Donatusstrasse 43, 66822 Lebach, Germany

[21] Appl. No.: 591,628

[22] PCT Filed: Jul. 22, 1994

[86] PCT No.: PCT/DE94/00849

§ 371 Date: Feb. 15, 1996

§ 102(e) Date: Feb. 15, 1996

[87] PCT Pub. No.: WO95/06083

PCT Pub. Date: Mar. 2, 1995

[30] Foreign Application Priority Data

Aug. 23, 1993 [DE] Germany ............... 43 28 226.1

[51] Int. Cl.⁶ .................................................. B01D 39/00
[52] U.S. Cl. ................... 210/500.37; 210/500.38; 210/500.41; 210/500.43; 210/490; 204/182.3; 204/182.4; 521/27; 427/244
[58] Field of Search .................... 210/638, 500.37, 210/500.38, 500.41, 500.43, 490; 204/182.3, 182.4; 521/27; 427/244

[56] References Cited

U.S. PATENT DOCUMENTS

| | | |
|---|---|---|
| B 433,930 | 3/1976 | Gregor . |
| 3,454,490 | 7/1969 | Wallace ........................ 210/638 |
| 3,700,623 | 10/1972 | Keim . |
| 4,116,889 | 9/1978 | Chlanda et al. ............... 521/27 |
| 5,045,171 | 9/1991 | MacDonald ................... 204/296 |
| 5,085,784 | 2/1992 | Ostreicher .................... 210/502.1 |

FOREIGN PATENT DOCUMENTS

| | | |
|---|---|---|
| 1200158 | 2/1986 | Canada ........................ 210/500.38 |
| A-1 562 003 | 4/1969 | France . |
| B-10 45 648 | 12/1958 | Germany . |
| A-20 50 785 | 4/1971 | Germany . |
| A 31 43 804 | 12/1982 | Germany . |

Primary Examiner—Ana Fortuna
Attorney, Agent, or Firm—Henry M. Feiereisen

[57] ABSTRACT

Chloromethylated polymers are generally used to produce strongly alkaline anion exchange membranes. This requires handling toxic chloromethyl ethers. The object of the invention is thus to create anion exchange membrane which is easy and cheap to produce in a reproducible manner and has good electrochemical properties. It has been discovered that halogenated polyethers, preferably epichlorohydrin polymers with tertiary amines together with an inert polymer may be shaped into such membranes having a high mechanical stability. These membranes may be designed as anion exchange membranes for electrodialytical desalination as acid blocker anion exchange membranes for electrodialysis of acid solutions or as large pore membranes for the transport of large anions.

11 Claims, 1 Drawing Sheet

STRONGLY ALKALINE ANION EXCHANGE MEMBRANES AND PROCESS FOR PRODUCING THE SAME

FIELD OF THE INVENTION

The invention refers to a new ion exchange membrane and a process for producing the same.

Ion exchange membranes are of importance as indispensable diaphragms for the electrodialysis and the electrolysis, and alternatingly used in form of cation and anion exchange membranes between a pair of electrodes for subdividing the electrolyte solutions in different process streams.

Both types of ion exchange membranes facilitate the transport of one of the respective types of ions, i.e. either cations or anions. Together, a pair of membranes thus effects the transfer of salt.

DESCRIPTION OF THE PRIOR ART

To date, anion exchange membranes are mainly made on the basis of copolymers of styrene. Primarily, styrene and divinyl benzene/ethyl vinyl benzene are polymerized together with inert polymers (Paste-Method) and subsequently functionalized through chloromethylation and following amination.

Apart from styrene as a matrix polymer, polysulfones, polyether sulfones or poly (vinylpyridine) derivatives can also be used.

This method effects formation of film and functionalization of the film in two separate steps. This significantly complicates a development of membranes with special properties. Often, the use of e.g. softeners must be added as filler material for the not yet functionalized film.

Besides this Paste-method (Mizutani et al.; Bull. Chem. Soc. Japan, 38(5) p. 689–94), polymers that contain an active halogen can be formed in one method step into a film (membrane formation step), at the same time functionalized, and a crosslinking can be effected that corresponds to the degree of crosslinking of the product (Desalination, 79 (1990) 125–144). Such a membrane must be swollen before being used in the application medium. This process requires, however, a chloromethylated polystyrene which is not available on a large scale and necessitates the use of toxic (chloromethyl) methyl ether. The use of the aromatic matrix polymer results also in membranes which are easily contaminated as the aromatic matrix has a tendency to pick up dirt. This is one of the greatest unsolved problems of electrodialysis.

Membranes were also made through crosslinking of polyethylene imine with epichlorohydrin oligomerics (An. Quim., Ser. B 1982, 78(2), 221-3; CA 98:75956y). The resulting membranes have the great drawback of being weakly basic (See: Advances in polymer science 70 p. 92) and therefore unsuitable for use in neutral solution. They have a statistical distribution of secondary, tertiary and quaternary nitrogen atoms. The reproduction of such membranes becomes therefore difficult; the degree of swelling of the membranes is pH dependent.

SUMMARY OF THE INVENTION

It is the subject matter of this invention to provide a strong alkaline anion exchange membrane which 1. is easy and inexpensive to produce, i.e. yields a membrane in a single membrane forming step, without any successive derivatization reactions.
2. is resistant to pollution, and
3. has properties that can be suited to particular requirements (e.g. acid blockers, permeable membranes for great anions, alkaline stable anion exchange membranes).

It was found that the highly aminated products obtained by the reaction of poly (epichlorohydrin), poly (epichlorohydrin-co-ethylenoxide) or similar polymers with tertiary amines, preferably 1,4-diazabicyclo-(2,2,2)-octane, in dipolar aprotic solvents can be converted to mechanically self-supporting membranes with suitable inert polymers, to meet the afore-mentioned conditions. These membranes can particularly be made as acid blocker membranes for the electrodialysis of acids with high current output, or as membranes for transport of particular large anions.

DESCRIPTION OF THE INVENTION

Figure 1:
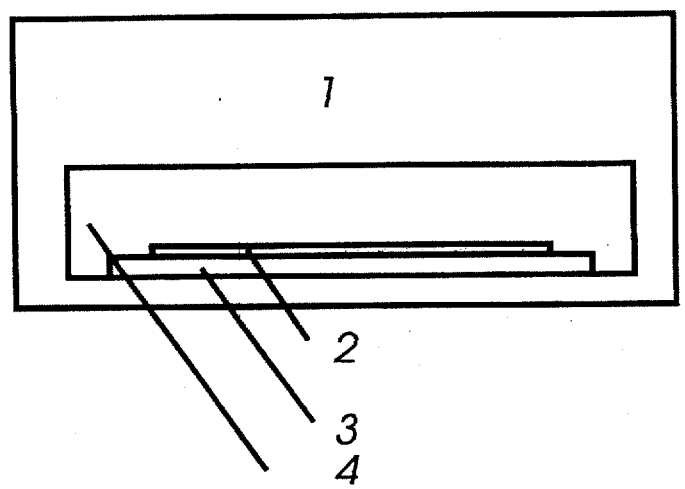
FIG. 1 shows a schematic cross section through the experimental structure for making the anion exchange membranes. The closed reaction vessel 4 is installed in a conditioned room 1 (drying cabinet). Its size is suited to the size of the membrane surface 2 which is placed upon a flat surface 3 (e.g. a glass plate).

The membranes are produced in a manner known per se by applying a casting solution on a support e.g. a glass plate, steel plate, roller, nonwoven reinforcing material, fabric, in form of a film of e.g. 0.2 to 2 mm thickness, and heated in a drying cabinet, through radiation with an infrared lamp or through heating of the roller drum. Solvents are evaporated thereby, and the amine reacts with the reactive halogen of the polymer at the same time. Thus, the firm, finished membrane is prepared from the casting solution.

This membrane forming step can be controlled such that a certain residual amount of solvent remains in the membrane matrix, or that the entire solvent evaporates.

Thus, a closely adhering, often brittle, hard film, is obtained upon the support. By dipping this product in a suitable medium, e.g. diluted aqueous salt solutions, the membrane swells in the respective solvent. It softens and becomes flexible and loses the adhesion to the support. It detaches from the support in a form ready for use.

The membrane can also be made by applying casting solution upon a reinforcing fabric or enveloping reinforcing fabric with the casting solution, or by applying a fabric upon the liquid film. Thus, reinforced membranes can be obtained.

The membranes according to the present invention are characterized by the fact that the solution forming the membrane comprises three functional components. The selection and adjustment of these three components—active polymer, amine component and inert polymer—determine the nature of the membranes. The adjustment has to be executed in the solvents of the casting solution and must be stable in the finished membrane. Dipolar aprotic solvents such as dimethylformamide (DMF), dimethylacetamide or cyclohexanone are suitable as solvents. It is also of advantageous to use mixtures of solvents because the solubility and compatibility of the polymers are generally slightly improved.

The nature of the membranes of the present invention is determined by the type of the reactive, halogen-containing polyether being used.

The reactive polymer used here has a polymeric main chain characterized by ethylenoxide groups, with a characteristic components of the formula

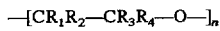

wherein at least one of the residues $R_1$–$R_4$ is a $CH_2Z$ group with Z=halogen, and shows several differences compared with normally used reactive polymers to yield through combination with respective amines and possibly inert polymer and a good selection of reaction conditions a wide range of new membranes which show unexpected properties.

The reactive component according to the present invention meets different fundamental preconditions: It is industrially easily available and the production does not require chloromethylation as process step. It is inexpensive, of pure aliphatic structure so that membranes resulting therefrom do not have a tendency for pollution, and can be used with such inert polymers that are unsuitable for use with other basic polymers.

Furthermore, the halogenated polymers according to the present invention have a significantly smaller molar mass of the monomer unit compared with chloromethylated polystyrenes or polysulfones. The attainable fixed ion concentrations in the membranes are significantly higher because there are more reactive groups per gram polymer, as can be seen from table 1.

TABLE 1

| Substance | equivalent mass |
|---|---|
| 100% chloromethylated polystyrene | 151.5 g/mol active Cl |
| 20% chloromethylated polystyrene | 575.5 g/mol active Cl |
| polyepichlorohydrin | 91.5 g/mol active Cl |
| poly-(epichlorohydrin-co-ethylenoxid) | 135.5 g/mol active Cl. |

To produce anion exchange membranes with a low proton leakage, a homogenous membrane matrix with a high fixed ion concentration and a low water content is necessary. These conditions are essential to reach an effective Donnan-exclusion even for the very mobile protons.

In order to allow in contrast thereto penetration of large anions through the membrane, large channels in molecular dimensions must be present in the membrane.

It has surprisingly been found that the use of the combination of active components together with further components of the present invention can meet both extreme demands on anion exchange membranes.

Beside these favorable aspects, the main further difference of the used reactive polymer compared to other reactive polymers is its lower reactivity towards tertiary amines.

Whereas polymers containing benzylhalide groups often quickly react with most tertiary amines at room temperature, the reactivity of tertiary amines with the halogenated polyethers according to the present invention is very different. Various amines do not react at all in DMF, e.g. $NEt_3$ or $PPh_3$ (Okawara, M. et al; Chemical modification of polyvinylchloride and related polymers; ACS Symp. Ser. 121 p. 56), others react only in part, e.g. dimethylethanolamine 66 mol % (Schlatzer, Robert et al; Ger. Offen. 2,540,310; CA 85: 34031f) and carbazole under phase transfer conditions up to 66 mol % (Thanh Dung N'Huyen et al; Polymer 19, 424), and others react completely such as trimethylamine under pressure in autoclave (Ando, Shin; Japan. Kokai 76 69,434; CA 85:150995x) or 1,4-Diazabicyclo-(2,2,2)-octane (see example 10).

Tertiary amines react with organic halogen compounds to a chemical uniform quaternary ammonium salt. Diamines can react with both amino groups at different molecules so that upon use of a polymeric halogen compound, crosslinking and formation of the quaternary ammonium ions is possible at the same time. It is therefore advantageous without any limitation of the invention to use tertiary diamines for quaternization and simultaneous crosslinking of the polymers used according to the invention.

The physical properties of the amines must also be suited to the process. To easily produce a membrane, it has to be possible to bound both the amine and the polyether together in the casting solution. Trimethylamine is a gas at standard conditions and thus can not be used in such a process.

The invention concerns membranes which meet the stated chemical and physical limiting conditions and the problem of the lower reactivity of the active component is solved easily by the combination with suitable amines and the proper selection of the reaction conditions.

When using polymers according to the present invention, a certain reaction time must be taken into consideration for the quaternization of the amine in order to ensure that the amine does not evaporate with the solvent used. This is attained in a simple manner by limiting the steam volume over the film during evaporation. According to an exemplary embodiment, the casting solution is spread over on an area of about 100 cm² at a thickness of e.g. 300 μm upon a glass plate of 10 by 20 cm, and this solution reacts in a tin vessel having dimensions of 22×21×4 cm in a drying cabinet at e.g. 125° C. Such an arrangement is schematically shown in FIG. 1.

The use according to the invention of 1,4-diazabicyclo-(2,2,2)-octane as amine component is particularly advantageous because the chemical and physical limiting conditions are met in an ideal manner and the composition is significantly activated for the quaternization of the first nitrogen atom. On the other hand, the above mentioned steps are essential during the reaction and evaporation of the solvent especially when using this amine for receiving good membranes because this amine has a strong tendency to evaporate with the solvent, especially DMF.

It has also been found advantageous to pre-react the casting solution at elevated temperature, mainly 80°–120° C. This results in an approximately 10 to 20% pre-substitution, without encountering a crosslinking of the polymer in the solution. It is possible, however, to carry out the substitution almost completely in advance by protecting in the di- or polyamine each amino group that exceeds one. Thus, the single remaining amino group can react with the polymer without crosslinking. After removing the protective group from the polymer-bound ammonium salt, the polymer can be crosslinked. Suitable as protective group is in particular a simple salt formation. Then, the polymeric ammonium salt is used instead of the reactive polymer in the casting solution.

By adding an inert polymer, the properties of the resulting membranes can be further varied. The use of poly-(epichlorohydrin) or derivatives, according to the invention affords the additional possibility to bound in the membrane inert polymers which could not be used before: During quaternization, the character of active polymer changes. The compatibility of the resulting polyetheramine with different polymers is improved compared to the halogenated polyether composition. Therefore, other polymer mixtures can be made therewith in contrast to the originally halogenated polyether. For example, it may be possible that the casting solution initially forms a two phase system which mixes through heating and stirring only after a certain time.

Thus, a further variation of membranes is attained because the mechanical properties are essentially determined by the inert component. By using polymeric nitriles, membranes of high tensile and tear-resistant characteristics can be made whereas the use of polysulfones results in elastic membranes which are resistant to bending. Depending on the composition of the membrane, it is even possible to fold the membranes without destruction. Therefore, membranes according to the present invention can often be used without a reinforcing fabric.

Polyepichlorohydrin or its reaction products are relatively poorly compatible with Udel® polysulfone. Often two phase systems are formed. The membranes according to the invention can however be made as a macroscopically homogeneous film by using up to 30% or more than 70% polyepichlorohydrin. Membranes of this type are stable in alkaline solutions.

Polyepichlorohydrin can be manufactured with polyacrylonitrile (PAN) in every ratio. While PAN can not be blended with polyepichlorohydrin, the polymers become compatible during the membrane-forming reaction. Surprisingly, the resulting membranes according to the invention are stable in 4N HCl and have high transfer numbers for chloride. This is particularly surprising, because PAN is normally hydrolyzed by acids. This would cause destruction of the membrane. Because of the low proton leakage of the membranes according to the present invention, the protons can not adversely affect the membrane body according to the invention.

The addition of further primary, secondary or tertiary amines can be of great advantage in order to increase the fixed ion concentration or to achieve a certain increase in crosslinking.

Other possible inert polymers include further polymers soluble in DMF, N-methylpyrrolidone or cyclohexanone, such as e.g. polymethacrylonitrile, polyvinylidenefluoride, polyethersulfone, polystyrene or polyvinylbutylether.

BEST MODE OF EXECUTING THE INVENTION

Taking into account the preceding description and without limitation of the invention, the preferred method os executed by adding to a solution of reactive polymer the amine component, preferably 1,4-diazabicyclo-(2,2,2)-octane as substance or solution, at a mass ratio of reactive polymer to amine of 1:1–2,5, then a solution of inert polymer is added, and subsequently the solution is heated to 50°–1000° C. until the viscosity of the solution rises considerably. The optimum temperatures and time periods for this step depend on the respective composition and concentration and must be determined experimentally each time. Typical values are however 70°–900° C. and 2 to 12 h. Also the optimum ratio of reactive polymer to amine should be adjusted experimentally. Typical concentrations of used polymer solutions are 10 to 15%. Subsequently, further amine components or further active polymer can be added.

Membranes are then made from the casting solutions prepared in such a manner, as shown in example 1, in an apparatus according to FIG. 1. Also in this case, temperature and duration of the thermal treatment of the film must be determined experimentally. Often, membranes are found which have been treated too long or too hot, and have brittle character.

If the casting solution should have a higher pre-substitution, it is best prepared by adding to a solution of reactive polymer the amine component, with a protecting group on each amino group that exceeds one. Preferably the mono hydrochloric acid salt of 1,4-diazabicyclo-(2.2.2)-octane is used as such a component. This mixture treated as described above until the viscosity of the solution raises considerably has a considerably higher pre-substitution rate. It can be used as a casting solution after removing the protective group.

This is best be done by ion exchange in aqueous solution: Thus, the non aqueous solution is changed to aqueous solution by dilution with water, treated with a weakly basic ion exchanger to remove the protective chloride salt fraction and changed again into the non-aqueous solution by evaporating the water and dissolving the remaining polymer in the desired solvent. This solution can be used as a casting solution as described below. This process to increase the pre-substitution rate is illustrated in example 10.

To make membranes with low proton leakage, polyepichlorohydrin has been found to be most suitable as active polymer. Preferably 60 to 90% of PAN can be added as inert polymer.

Produced acid blocker anion exchange membranes can be used wherever anion exchange membranes are needed, preferably in acid solutions. This is in particular the case e.g. in electro-electrodialysis, in the electrodialysis with bipolar membranes and in EOP of acids. The large proton leakage of anion exchange membranes according to the prior art yields a low current efficiency for the acid production. The use of acid blocker according to the invention significantly increases the current efficiency and energy yield of such processes.

Poly-(epichlorohydrin-co-ethylenoxide) or terpolymers of epichlorohydrin, proved to be the most suitable components as polymers in order to produce membranes with a permeability for large anions. Also in this case is PAN useful as inert polymer, with the fraction thereof being adjustable to the application at hand. Typical values are 30–50%.

Membranes of this type are permeable for anions (e.g. boric acid-sugar-esters, MW ca. 400g/mol), which cannot pass any conventional anion exchange membrane without destroying or blocking the membrane. Thus, completely new possibilities of applications to separate or enrich great organic acids, e.g. sulfonic acids, acid dyes, pharmaceutical products etc., by electrodialytic process technologies. Such an application benefits from the purely aliphatic character of the membranes which have less tendency than aromatic membranes to absorb respectively organic species.

Through respective composition, also "normal" anion exchange membranes can be made, with the surface resistance of the membranes being in general very low. These membranes can be used e.g. in electrodialysis of sea water or in acid dialysis.

The membranes according to the present invention are also superior for production of multilayer membranes. It is possible e.g. to apply a cation exchange membrane onto an anion exchange membrane. Advantageously, this is accomplished by applying a casting solution of a cation exchange membrane, as described e.g. in DE-OS 3143804, example 2, and thermally removing the solvent on an anion exchange membrane.

The subject matter of the invention is illustrated without any limitation with reference to the following examples.

EXAMPLES

The following measurements are carried out to evaluate the membranes: The permselectivities of the membranes are determined from the concentration potentials between 0.1 and 0.5N potassium chloride solutions (Desalination, 79 (1990) 125–144) and the membrane resistances are determined in 1N KCl or according to example 9 in the stated solutions (Kerres, J; Eigenberger, G: Preprint of Aachener Membran Kolloquium 9.-11.3.93) The permselectivities P are defined as the ratio of measured $\psi_{gem}$ to theoretical diffusion potential $\psi_{theo}$ $$P=\psi_{gem}/\psi_{theo}$$

The linear expansion is determined by observing two points on the surface before and after the swelling in 0.5N NaCl-solution. The relative increase of the distance between the two points in percent corresponds to the linear expansion. The thickness of the membrane is determined using a micrometer screw on the moist membrane.

1. A solution A is prepared by dissolution of 20 g poly-(epichlorohydrin) in 80 g DMF. A solution B is prepared by dissolution of 12 g PAN in 88 g DMF. A solution C is prepared by dissolution of 12.25 g 1,4-diazabicyclo-(2, 2,2)-octane in 88 g DMF.

1 ml solution A, 1.1 ml solution B and 1.2 ml solution C are mixed by stirring with a magnetic stirrer and heated to about 8000° C. for 30 min. The resulting clear casting solution is spread over a glass plate in form of a film of 1 to 2 mm thickness. The glass plate is placed in a reaction vessel, e.g. of dimensions measuring 21×22×4 cm, as shown in FIG. 1, heated for 2 h at 110° C. in a drying cabinet, and then solvent is removed by heating for 30 min. at 130° C. After cooling, the glass plate with adhering polymer film is placed in 0.5N NaCl solution. After some minutes, the membrane detaches from the glass plate. The membrane exhibits a thickness of 0.12 mm, an ohmic resistance of 23.5 $\Omega*cm^2$ and a permselectivity of 93.4%.

2. 2 ml solution A, 2.2 ml solution B and 0.8 g 1,4-diazabicyclo-(2,2,2)octane are heated and mixed, and a membrane is made from this casting solution, as described in example 1. The resulting membrane has a linear expansion of more than 25%.

3. 10 mg polyethylenimine (Fluka) are added to the casting solution according to example 2, and a membrane is made from this solution, as described in example 1. The resulting membrane has a linear expansion coefficient of less than 5%. It shows a permselectivity of 93.0%.

After being stored in 4N HCl at 80°–90° C. for 42 h, the membrane shows a permselectivity of 92.0% after swelling in 1N KCl.

4. 10 ml solution A, 39 ml solution B and 20 ml solution C are mixed, and a membrane is made from this casting solution, as described in example 1.

The membrane exhibits a thickness of 0.045 mm, an ohmic resistance of 7.5 $\Omega cm^2$ and a permselectivity of 89.6%. The membrane is equilibrated in 1N HCl and the resulting membrane potential is measured between 0,1N HCl and 4N HCl by means of two Ag/AgCl electrodes. A diffusion potential of 62 mV is measured between 0.1 and 2N hydrochloric acid.

Figure 2:
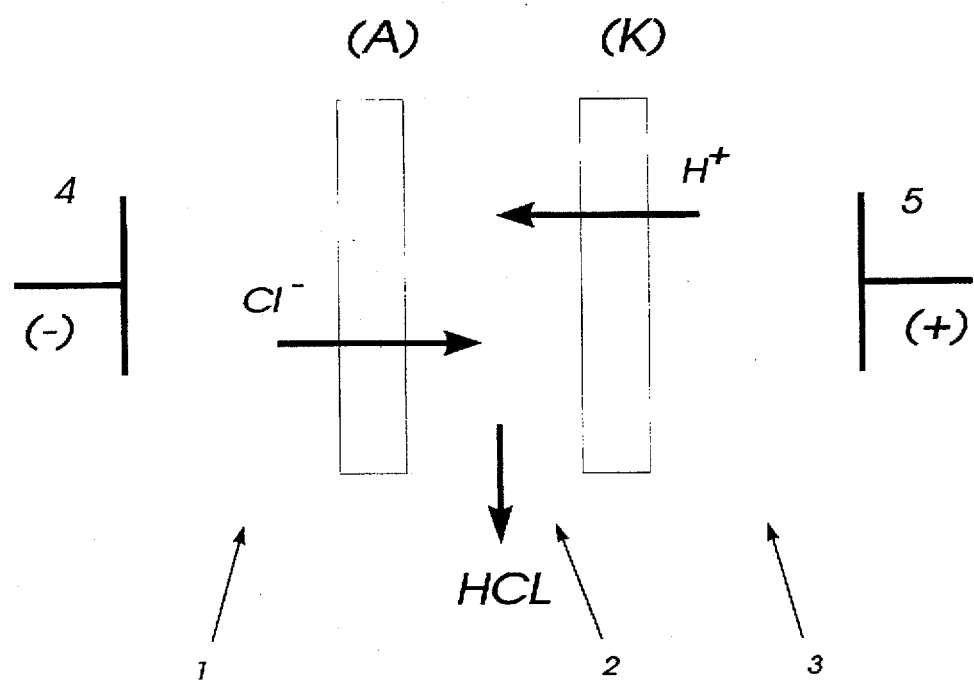
FIG. 2 shows a schematical arrangement to electroosmotically pump (EOP) acids. The minimum configuration is realized comprising a repeating unit, with the diluate compartment being identical with the cathode compartment. Positioned between anode 5 and cathode 4 is a cation exchange membrane (K) and an anion exchange membrane (A) so that three chambers 1, 2 and 3 are formed. Pumped through chamber 1 is the acid being concentrated, and through chamber 3 any strong acid, e.g. sulfuric acid. Chamber 2 contains the concentrated product.

5. A EOP-test is executed to check the efficiency of the membrane. An electrolysis apparatus with three cells, according to FIG. 2, includes between the anode compartment 3 and the cathode compartment 1 a further chamber 2 which is separated from the cathode compartment by the anion exchange membrane (A) being tested and separated from the anode compartment by a cation exchange membrane (K) (Selemnion CMV).

Pumped in the cathode compartment are 1000 ml 1 N hydrochloric acid and 1000 ml 1N sulfuric acid are pumped in the anode compartment.

By applying a current, protons are transported from the sulfuric acid of the anode compartment and chloride ions are transported at the same time from the hydrochloric acid of the cathode compartment into the chamber 2.

Consequently, hydrochloric acid is accumulated here. As the volume of the resulting acid increases, it drips from this chamber and can be collected by an appropriate device. The solution in this chamber is neither circulated nor stirred. In order to initially fill out the volume of the middle chamber, 1N hydrochloric acid is added and current is conducted through the apparatus until the concentration of the overflowing acid is constant.

A membrane according to example 4 is used, which is reinforced by a polyamide fabric with 51% free surface and has a thickness of 0.09 mm.

Applying a current density of 100 mA/cm² at 30° C. results in a hydrochloric acid of 3.92N at a flow of 0.36 g/hcm$^{-2}$. This corresponds to a current efficiency of 38,4%.

6. An EOP-test as described in example 5 is executed, with the difference residing in the substitution of the membrane according to example 4 by an acid blocker anion exchange membrane of the type ACM from the company Tokuyama Soda.

Applying a current density of 100 mA/cm² and a temperature of 30° C. results in a 3.90N hydrochloric acid at a flow of 0.31 g/hcm². This corresponds to a current efficiency of 33.1%.

7. 2 g poly-(epichlorohydrin) are dissolved in 18 g N-methylpyrrolidone and 2 g 1,4-diazabicyclo-(2,2,2)-octane are added and heated to 90° C. 0,54 g polysulfone are dissolved at 70° C., and a membrane is made from this casting solution, as described in example 1.

The membrane has a thickness of 0.085 mm, an ohmic resistance of 5 $\Omega cm^2$ and a permselectivity of 94.6%.

8. Example 7 is repeated with the variation of substituting polysulfone with polyethersulfone.

The resulting membrane has an ohmic resistance of 9 $\Omega cm^2$, a permselectivity of 92.8% and a thickness of 0.075 mm. After being stored in 10% NaOH for 48 h at 80°–90° C., the permselectivity is 90.5%.

9. A solution is prepared by dissolving log poly-(epichlorohydrin-coethylenoxid) in 90 g DMF. 12.3 g 1,4-diazabicyclo-(2,2,2)-octane are added, stirred and heated to 70° C. until the solution is noticeably more viscous (about 10 h). This solution is mixed with a 12% PAN solution in DMF according to the mass ratios shown in table 2 of inert polymer—original reactive polymer. Membranes are made from this casting solution as shown in example 1, and however, reinforced through inlay of a polyamide fabric with a free area of 51%.

The resulting membranes are characterized by the resistance in saturated aqueous solutions of the substances referred to in the table. For purposes of comparison, also a commercially available anion exchange membrane of the type Asahi AMV is characterized.

TABLE 2

| Inert fraction mass % | Potential 0.1/0.5 N KCl mV | Resistance in saturated solution of | |
|---|---|---|---|
| | | Sodium dodecyl sulfate $\Omega\,cm^2$ | Anthraquinone sulfonic acid sodium salt $\Omega\,cm^2$ |
| 50 | 33.7 | 3600 | 8140 |
| 45 | 31.5 | 470 | 435 |
| 40 | 29.8 | 98 | 135 |
| Asahi AMV | | 14000 | 40000 |

10. A solution of 2 g poly-(epichlorohydrin) and 1.23 g 1,4diazabicyclo(2,2,2)-octane and 1.95 g 20% hydrochloric acid in 25 ml DMF is held at 120° C. for 16 h in an oil bath. After dilution with water, this solution is conducted over a weak basic anion exchanger to convert the ammonium salt of the tertiary amine into the free amine. The resulting solution is concentrated in vacuum at 60° C. oil bath temperature and received in 30 ml DMF. After being mixed with solution A to a PAN-content of 50 mass %, the membrane is made, as described in example 1. The membrane has a permselectivity of 87.3%, an ohmic resistance of 3.1 $\Omega cm^2$ and a thickness of 0.06 mm.

11. The procedure follows example 3. However, the film received after treatment in the furnace is not watered but an approx. 35% solution of a sulfonated polysulfone (as described e.g. in DE OS 3143804 in example 2) is spread in form of a film of a thickness of about 0,1 mm. The solvent is removed by heating in the drying cabinet at 125° C. The resulting double layer membrane has bipolar character.

I claim:

1. Anion exchange membranes produced from a solution of polymers containing reactive halogen-containing functional groups, tertiary amines, and inert polymer, by thermal quaternization of the amine through the reactive halogen-containing polymer at 30° to 200° C. and simultaneous evaporation of the solvent after formation of a film, wherein the polymer which contains reactive halogen-containing functional groups is a halogenated polyether soluble in a solvent and having a polymeric main chain being characterized by ethyleneoxide groups, with a characteristic component having the formula

wherein at least one of the residues $R_1$–$R_4$ is a $CH_2Z$ group with Z=halogen.

2. Anion exchange membrane according to claim 1 wherein the halogenated polyether which contains reactive halogen-containing functional groups is epichlorohydrin-polymer selected from the group consisting of polyepichlorohydrin, epichlorohydrin rubber, epichlorohydrin-ethyleneoxide copolymers and terpolymers of epichlorohydrin.

3. Anion exchange membrane according to claim 1, wherein the tertiary amine comprises two or more tertiary amino groups per molecule.

4. Anion exchange membrane according to claim 3 wherein the tertiary amine is 1,4-diazabicyclo-(2,2,2)-octane.

5. Anion exchange membrane according to claim 1 wherein the inert polymer is selected from the group consisting of polysulfone, polyethersulfone, polymethacrylonitrile, polyacrylonitrile and copolymers of the respective monomer units.

6. Anion exchange membrane according to claim 1 wherein the anion exchange membrane has a permselectivity for chloride of more than 75% in 2N hydrochloric acid.

7. A process of making anion-exchange membranes according to claim 1 through spreading the polymer solution to form a film, wherein the film is made in a reaction vessel with a steam volume of less than 3000 ml per 100 $cm^2$ of membrane area through heating up to 100° to 130° C.

8. Bipolar membranes wherein the anion exchanging layer of this membrane is made according to claim 1.

9. A method of making ion exchange membranes according to claim 1 wherein the casting solution is prepared by:

a) reacting said polymer containing reactive halogen-containing functional groups with said tertiary amines, said tertiary amines containing amino groups; all but one of said amino groups having been protected through formation of hydrochlorides, b) removing the protective group through ion exchange to obtain a quaternary polyether ammonium salt having a polymeric main chain in the residues $R_1$–$R_4$, quaternary ammonium groups, amino groups, and nucleophilic substitutable halogen, c) changing said polymer by concentrating the ion exchange permeate and solving the residue in an appropriate solvent, and d) mixing the polymer solution with inert polymer to form a casting solution.

10. Method according to claim 9 wherein the quaternary polyether ammonium salt includes 0.5–95 mol % of originally available, active, nucleophilic substitutable organic halogen.

11. Method according to claim 9 wherein the polyether ammonium salt is mixed with the original halogenated polymer so as to obtain a mixture containing 0.5–95 mol % of the total originally available active nucleophilic, substitutable organic halogen.

* * * * *